Nov. 7, 1939.    M. DE FALCO    2,179,405
POWER TRANSMISSION MECHANISM
Filed July 10, 1937    2 Sheets-Sheet 1

Inventor
MARIO DE FALCO
Attorney

Nov. 7, 1939.　　　M. DE FALCO　　　2,179,405
POWER TRANSMISSION MECHANISM
Filed July 10, 1937　　2 Sheets-Sheet 2
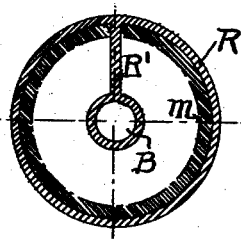
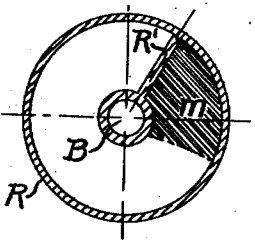
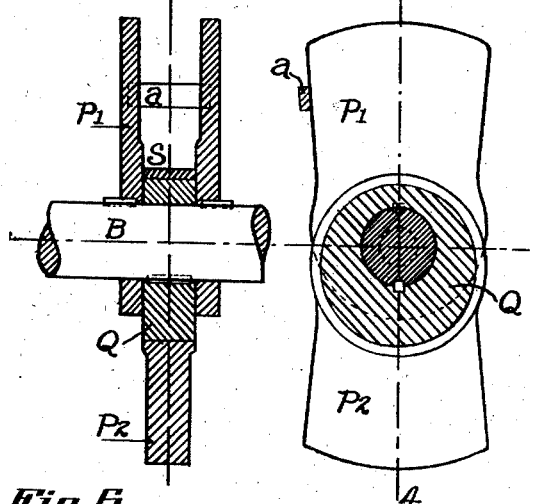
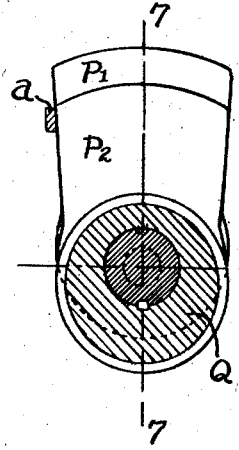
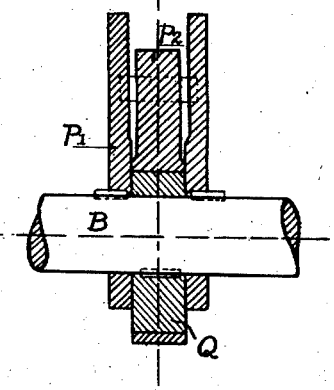
Inventor
MARIO DE FALCO
Attorney

Patented Nov. 7, 1939

2,179,405

UNITED STATES PATENT OFFICE

2,179,405

POWER TRANSMISSION MECHANISM

Mario de Falco, Rome, Italy

Application July 10, 1937, Serial No. 152,890
In Italy August 5, 1936

2 Claims. (Cl. 74—260)

This invention relates to power transmission mechanisms and particularly to transmission mechanism in which shifting from one speed ratio to another can be effected automatically or semi-automatically.

An object of the invention is to provide transmission mechanism having planetary gears and in which either a direct drive or a lower speed drive through gearing can be obtained.

Another object of the invention is to provide for shifting automatically from a direct drive to a lower speed drive through gearing, and for shifting semi-automatically from the drive through the gearing to direct drive.

Another object of the invention is to attain a direct drive with a minimum utilization of centrifugal force.

Another object of the invention is to provide transmission mechanism having centrifugal means which is unbalanced while the mechanism is operating at one speed ratio and balanced while the mechanism is operating at another speed ratio.

Another object of the invention is to utilize centrifugal weights which are not subject to variations in quantity of motion during transmission of power, so that no losses arise, and in which no work is required of such weights in shifting from one speed ratio to another, their operation being restricted solely to maintenance of synchronism between the driving and driven shafts of the mechanism.

Another object of the invention is to render unnecessary all epicycloidal or hypocycloidal motions and have only simple circular motions, thereby achieving greater power output and less wear.

These and other objects and advantages of the invention will be apparent from the embodiment of the invention illustrated by way of example in the accompanying drawings in which:

Fig. 3 is a detail sectional view of a mercury capsule centrifugal device which may be used on the planetary gear shaft of the transmission of Figs. 1 and 2 instead of the weights shown thereon, this figure showing the disposition of the mercury when the shaft is rotating on its own axis;

Fig. 3A is a view similar to Fig. 3 but showing the disposition of the mercury when the planetary gear shaft is rotating about the axis of the driving and driven shafts of the transmission;

Fig. 4 is a detail sectional view, taken substantially on the line 4—4 of Fig. 5, of the centrifugal weights used in the transmission of Figs. 1 and 2, and showing the position of the weights when the planetary gear shaft is rotating on its own axis;

Fig. 5 is an end elevation of the centrifugal weights of Fig. 4, parts being shown in section;

Fig. 6 is a view similar to Fig. 5 but showing the position of the weights when the planetary gear shaft is rotating about the axis of the driving and driven shafts; and Fig. 7 is a sectional view taken substantially on the line 7—7 of Fig. 6.

In all the views, similar parts are designated by the same reference letters.

Figure 1:
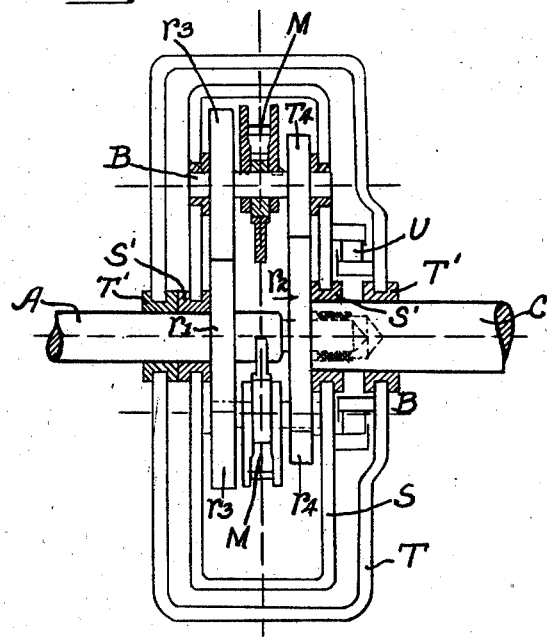
Fig. 1 is a side sectional view of a planetary transmission in accordance with the invention, the view being taken substantially on the line 1—1 of Fig. 2, and some of the parts being shown in elevation.
Figure 2:
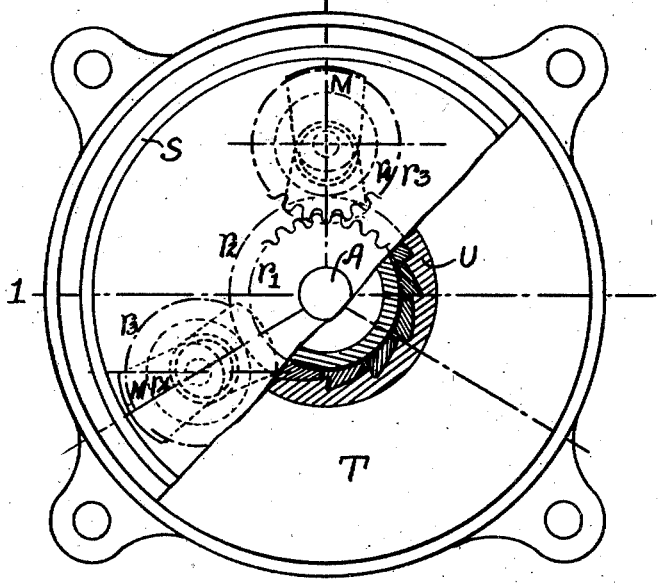
Fig. 2 is an end elevation of the transmission of Fig. 1, part of the casing being broken away, and a one-way clutch embodied in the mechanism being shown in section.

Referring first to Figs. 1 and 2, the mechanism shown is intended to transmit motion from a driving shaft A to a driven shaft C, the two being coaxial with each other as shown in Fig. 1, through two or more countershafts or planetary gear shafts B, which are parallel with and equidistant from the driving and driven shafts. The shafts B are rotatably mounted in a planetary casing S and the latter is rotatably mounted on the driving and driven shafts by suitable bearings S'. The entire gearing, including the rotatable casing S, is enclosed by a fixed casing T which has suitable bearings T' constituting supports for the driving and driven shafts.

Fixed on the driving and driven shafts respectively are gears $r1$, $r2$ meshing with planetary gears $r3$, $r4$ on the shafts B.

A one-way brake mechanism indicated generally by U is arranged between concentric portions of the planetary casing S and fixed casing T. Any usual form of one-way brake mechanism may be used but I prefer to use the mechanism described in my copending application No. 152,889 entitled "One-way clutch mechanism", of even date herewith.

It will be appreciated that, as long as the planetary gear casing S is stationary, the transmission will have the ratios determined by the radii of the gears $r1$, $r2$, $r3$, $r4$. On the other hand, when the casing S assumes a speed of rotation equal to that of the driving shaft A, the driven shaft C will take on the same speed and there will be a direct drive from the driving shaft to the driven shaft.

If the gears $r1$, $r2$, $r3$, $r4$ have ratios such that (with the casing S stationary) the speed of the driven shaft C is less than that of the driving shaft A, the casing S will tend to rotate in a direction opposite to the direction of rotation of shaft A, when power is transmitted from A to C, and this rotation is prevented by means of the one-way brake or free-wheeling mechanism U referred to above.

When, under such conditions of transmission (i. e. with the drive going through the gears $r1$, $r2$, $r3$, $r4$), the resistance torque diminishes to the point of making direct drive between A and C proper, if the fuel supply of the engine driving the shaft A is cut off, the momentum stored up in the driven shaft C carries the whole unit along and imparts to casing S an accelerated rotary motion which, in this instance, has the same direction as that of shafts A and C. The fuel supply can be cut off manually (e. g. by releasing the accelerator pedal in the case of an automobile).

When the casing S has attained the speed of the driving shaft A, upon restoration of the fuel supply, there will evidently be a full power direct drive transmission between A and C, provided rotation of the planetary gear shafts B in their bearings is prevented.

It is preferred to prevent this rotation by establishing, by centrifugal means forces acting on the shafts B, a torque equal and opposite to the difference of the torques applied to planetary gears $r3$ and $r4$. In Figs. 1 and 2 this is accomplished by centrifugal weights generally designated M. The shift from direct drive to the lower gear ratio is effected automatically when the resistance torque again overcomes the driving torque, inasmuch as the torque generated by the weights M is no longer sufficient to prevent rotation of the shafts B.

The use of centrifugal weights M would involve difficulties of a mechanical nature during the period of drive through the gearing (when the shafts B are rotating on their own axes) if these weights were not balanced while in that phase of drive; on the other hand, when in direct drive, balancing must be precluded in order to permit the creation of the centrifugal torque mentioned above. Structural embodiments of the weights M will now be described which render it possible to satisfy the aforementioned requirements.

Referring first to Figs. 4-7 which show the weights M of Figs. 1 and 2 on a larger scale, it will be seen that two weights $P1$, $P2$ are provided on each shaft B, one of which $P1$ is integral with the shaft B while the other $P2$ is mounted on the shaft by means of an eccentric Q. Consequently, during rotation of the shaft B on its own axis, the weights $P1$, $P2$ will assume symmetrical positions with respect to the shaft as shown in Figs. 4 and 5. During rotation of the shaft B and casing S about the axis of the driving and driven shafts A, B, the weights $P1$, $P2$ will overlap in part as shown in Figs. 6 and 7, determining with their own masses the necessary centrifugal torque. A stop $a$ is provided to limit the movement of the weights.

Figs. 3 and 3A show a different form of centrifugal means which may be used instead of the weights $P1$, $P2$ of Figs. 4-7 if desired. This means comprises the well known mercury capsules which are suitable for use in this connection since, during the transmission of power, there is no motion of the mercury with respect to the capsules. The mercury capsule is designated R in Figs. 3 and 3A and consists of a hollow cylindrical box mounted on the shaft B. The box contains a quantity of mercury $m$ and is provided with a radial divider or partition $R'$. It is evident that, during simple rotation about the axis of shaft B, the mercury in the capsule or box R will take on a toric form which is perfectly balanced as shown in Fig. 3, while, during the rotation about the axis of shafts A, C, the mercury will assume the form of a quadrant juxtaposed to divider or partition $R'$, thus forming an eccentric mass as shown in Fig. 3A.

It will be understood from the above that the operation of the transmission will be substantially as follows, assuming the transmission is used in connection with an automobile engine. When starting, the shaft C will be driven through the gears $r1$, $r2$, $r3$, $r4$, the casing S being locked against rotation by the free-wheeling brake U, and the driven shaft C will be rotated in the same direction as the driving shaft A but at a lower speed. If now the conditions are such that the operator wishes to change to direct drive, he takes his foot off the accelerator pedal or otherwise slows down the speed of the shaft A. The shaft C however will continue to rotate under its own momentum substantially at its previous speed; thus the speeds of shafts A and C will tend to become equal. At or about the time the shafts A and C are rotating at the same speed, the planetary gear casing S will start to revolve in the direction permitted by the free-wheeling clutch, i. e. in the same direction as the shafts A and C. The casing S will rapidly accelerate and the acceleration causes the locking of the shafts B through the centrifugal torque developed by the combined mass of weights $P1$, $P2$ which have taken the position shown in Figs. 6 and 7 (or by the mercury in the position shown in Fig. 3A). The drive is then direct, with the casing S rotating at the same speed as the shafts A and C, and additional power may be applied to the shaft A as desired, without disturbing the direct drive. If now the torque resistance on the shaft C increases substantially, as when the automobile is going up a hill, the rotation of the casing S is slowed up and the effect of the centrifugal means is overcome. Thereupon a low speed drive through the gearing automatically begins, the casing S being locked to the outer fixed casing T by the free-wheeling clutch U. In this low speed drive, the shafts B are rotating and the weights $P1$, $P2$ assume their balanced positions shown in Figs. 4 and 5 (or the mercury assumes the position shown in Fig. 3).

Although one embodiment of the transmission has been described by way of example, it will be understood that various changes may be made without departing from the invention. It will also be appreciated that with $n$ number of speed changes, such as that described, in series, $n+1$ speed ratios can be obtained. In the foregoing description, reference has been made several times, for purposes of illustration, to use of the invention in connection with automobiles, but the mechanism of the invention can of course be used wherever transmission of power is involved.

I claim:

1. Power transmission mechanism comprising coaxial driving and driven shafts, gears on said shafts, planetary gears meshing with said driving and driven shaft gears, a casing having a shaft on which said planetary gears are fixed, said shaft being rotatable on its axis and said casing being rotatable about the axis of the driving and driven shafts, and centrifugal means associated with said planetary gears and comprising a weight mounted directly on the planetary gear shaft and another weight mounted on said shaft through an eccentric.

2. Power transmission mechanism comprising coaxial driving and driven shafts, gears on said shafts, planetary gears meshing with said driving and driven shaft gears, a casing having a shaft on which said planetary gears are fixed, said shaft being rotatable on its axis and said casing being rotatable about the axis of the driving and driven shafts, and centrifugal means associated with said planetary gears and comprising a weight fixed on one side of the planetary gear shaft and another weight rotatably mounted on an eccentric fixed on said shaft with its greatest eccentricity displaced approximately 180° from the first-mentioned weight.

MARIO DE FALCO.